US010659130B2

(12) United States Patent
Zhang et al.

(10) Patent No.: US 10,659,130 B2
(45) Date of Patent: May 19, 2020

(54) TERMINAL, BASE STATION, AND CHANNEL INFORMATION OBTAINING METHOD

(71) Applicant: HUAWEI TECHNOLOGIES CO., LTD., Shenzhen, Guangdong (CN)

(72) Inventors: Leiming Zhang, Beijing (CN); Jianghua Liu, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/262,857

(22) Filed: Jan. 30, 2019

(65) Prior Publication Data

US 2019/0173548 A1 Jun. 6, 2019

Related U.S. Application Data

(63) Continuation of application No. PCT/CN2016/093640, filed on Aug. 5, 2016.

(51) Int. Cl.
*H04B 7/02* (2018.01)
*H04B 7/06* (2006.01)
(Continued)

(52) U.S. Cl.
CPC ......... *H04B 7/0626* (2013.01); *H04B 7/0632* (2013.01); *H04B 7/0634* (2013.01);
(Continued)

(58) Field of Classification Search
CPC .. H04B 7/0626; H04B 7/0632; H04B 7/0634; H04B 7/0413
(Continued)

(56) References Cited

U.S. PATENT DOCUMENTS

2010/0238824 A1 9/2010 Farajidana et al.
2010/0255790 A1 10/2010 Farajidana et al.
(Continued)

FOREIGN PATENT DOCUMENTS

CN 102349274 A 2/2012
CN 104768166 A 7/2015
(Continued)

OTHER PUBLICATIONS

Qualcomm Europe: "Calibration Procedures for TDD Beamforming", 3GPP Draft; R1-080494, vol. RAN WG1, no. Sevilla, Spain; Jan. 9, 2008, XP050109010, 6 pages.

*Primary Examiner* — Helene E Tayong
(74) *Attorney, Agent, or Firm* — Womble Bond Dickinson (US) LLP (57) ABSTRACT

This application relates to the field of mobile communications, and in particular, to technologies of obtaining channel state information in a wireless communications system. In a channel information obtaining method, a base station obtains channel state matrix information of some channels based on uplink reference information sent by a terminal and partial channel state information of channels between the base station and the terminal, to obtain channel state matrix information of the channels between the base station and the terminal. Base on this method, relatively complete channel state matrix information of the channels between the base station and the terminal can be obtained. This helps the base station select an appropriate parameter to transmit data to the terminal without causing an additional delay, performance loss, or cost increase, or consuming more time-frequency resources used for the uplink reference signal.

20 Claims, 4 Drawing Sheets

(51) Int. Cl.
*H04L 25/02* (2006.01)
*H04B 7/0413* (2017.01)

(52) U.S. Cl.
CPC ...... *H04L 25/0204* (2013.01); *H04L 25/0224* (2013.01); *H04B 7/0413* (2013.01)

(58) Field of Classification Search
USPC ........................................................ 375/267
See application file for complete search history.

(56) References Cited

U.S. PATENT DOCUMENTS

| | | | | |
|---|---|---|---|---|
| 2012/0252474 | A1* | 10/2012 | Tiirola | H04L 5/0048 455/450 |
| 2013/0315081 | A1* | 11/2013 | Kim | H04B 7/0417 370/252 |
| 2015/0092875 | A1* | 4/2015 | Kim | H04B 7/0478 375/267 |
| 2015/0319718 | A1* | 11/2015 | Yang | H04W 76/15 370/252 |
| 2015/0381252 | A1* | 12/2015 | Kang | H04B 7/024 370/329 |
| 2016/0248607 | A1 | 8/2016 | Choi et al. | |
| 2017/0019163 | A1* | 1/2017 | Yoshimoto | H04L 1/00 |

FOREIGN PATENT DOCUMENTS

| | | |
|---|---|---|
| CN | 105324953 A | 2/2016 |
| WO | 2015050421 A1 | 4/2015 |

* cited by examiner

TERMINAL, BASE STATION, AND CHANNEL INFORMATION OBTAINING METHOD

CROSS-REFERENCE TO RELATED APPLICATIONS

This application is a continuation of International Application No. PCT/CN2016/093640, filed on Aug. 5, 2016, the disclosure of which is hereby incorporated by reference in its entirety.

TECHNICAL FIELD

The present invention relates to the field of communications technologies, and in particular, to a terminal, a base station, and a channel information obtaining method.

BACKGROUND

In a communications system supporting MIMO (multiple-input multiple-output) technology, to implement downlink beamforming or spatial multiplexing, a base station needs to learn of channel state information of a downlink channel. In a TDD (time division duplex) system, frequency domain resources occupied by an uplink channel and a downlink channel are consistent, and reciprocity exists between the uplink channel and the downlink channel. Therefore, a base station can obtain channel state information of the downlink channel by receiving an uplink reference signal sent by a terminal. For reasons such as transmit power and implementation complexity, a quantity of antennas of the terminal that can simultaneously send a signal is usually less than a quantity of antennas that can simultaneously receive a signal. In this case, the base station can obtain channel state information of only some channels between the base station and the terminal by using the uplink reference signal sent by the terminal. For example, for the terminal, a quantity of antennas that can simultaneously receive a signal is four, and a quantity of antennas that can simultaneously send a signal is one. The base station can obtain channel state information of only ¼ of downlink channels between the base station and the terminal by using the uplink reference signal sent by the terminal.

To obtain channel state information of more channels, the terminal may send the uplink reference signal by using different antennas at different time points separately to obtain channel state information of channels between the base station and the terminal. Based on this method, although channel state information of more downlink channels can be obtained, switching between antennas causes an additional delay, performance loss, and cost increase, and occupies more time-frequency resources used for the uplink reference signal.

SUMMARY

Embodiments of the present invention describe a terminal, a base station, and a channel information obtaining method, so as to more conveniently obtain more channel state information of channels between the base station and the terminal.

According to a first aspect, an embodiment of the present invention provides a channel information obtaining method, including: sending, by a base station, a downlink reference signal to a terminal, where the downlink reference signal is used to obtain second channel information, and the second channel information is used to indicate partial channel state information of channels between the base station and the terminal; receiving, by the base station, an uplink reference signal from the terminal, where the uplink reference signal is used to obtain first channel information, and the first channel information is used to indicate channel state matrix information of some of the channels between the base station and the terminal; and receiving, by the base station, the second channel information from the terminal, where the first channel information and the second channel information are used to obtain channel state matrix information of the channels between the base station and the terminal.

In a possible embodiment, the method further includes: receiving, by the base station from the terminal, a sequence number of a transmit antenna corresponding to the uplink reference signal. The sequence number of the transmit antenna is used to adjust a sequence of rows or columns of a channel state matrix of the channels between the base station and the terminal. The adjustment may be considered as optimization of the channel state matrix of the channels between the base station and the terminal, helping the base station optimize subsequent transmission.

In another possible embodiment, the method further includes: sending, by the base station, indication information to the terminal. The indication information is used to instruct to perform hybrid feedback of channel information. Based on this design, the terminal can be triggered to send the uplink reference signal and feed back the second channel information to the base station. This helps adjust a channel information obtaining manner according to an actual requirement, so as to obtain a better channel estimation result.

According to a second aspect, an embodiment of the present invention provides a channel information obtaining method, including: receiving, by a terminal, a downlink reference signal from a base station, where the downlink reference signal is used to obtain second channel information, and the second channel information is used to indicate partial channel state information of channels between the base station and the terminal; sending, by the terminal, an uplink reference signal to the base station, where the uplink reference signal is used to obtain first channel information, and the first channel information is used to indicate channel state matrix information of some of the channels between the base station and the terminal; and sending, by the terminal, the second channel information to the base station, where the first channel information and the second channel information are used to obtain channel state matrix information of the channels between the base station and the terminal.

In a possible embodiment, the method further includes: sending, by the terminal to the base station, a sequence number of a transmit antenna corresponding to the uplink reference signal. The sequence number of the transmit antenna is used to adjust a sequence of rows or columns of a channel state matrix of the channels between the base station and the terminal.

In another possible embodiment, the method further includes: receiving, by the terminal, indication information from the base station. The indication information is used to instruct to perform hybrid feedback of channel information.

According to a third aspect, an embodiment of the present invention provides a base station, configured to implement the method in the first aspect. For example, the base station includes a processor, a transmitter, and a receiver. The processor is configured to: send a downlink reference signal to a terminal by using the transmitter, where the downlink reference signal is used to obtain second channel information, and the second channel information is used to indicate partial channel state information of channels between the base station and the terminal; receive an uplink reference signal from the terminal by using the receiver, where the uplink reference signal is used to obtain first channel information, and the first channel information is used to indicate channel state matrix information of some of the channels between the base station and the terminal; and receive the second channel information from the terminal by using the receiver, where the first channel information and the second channel information are used to obtain channel state matrix information of the channels between the base station and the terminal.

According to a fourth aspect, an embodiment of the present invention provides a terminal, configured to implement the method in the second aspect. For example, the terminal includes a processor, a receiver, and a transmitter. The processor is configured to: receive a downlink reference signal from a base station by using the receiver, where the downlink reference signal is used to obtain second channel information, and the second channel information is used to indicate partial channel state information of channels between the base station and the terminal; send an uplink reference signal to the base station by using the transmitter, where the uplink reference signal is used to obtain first channel information, and the first channel information is used to indicate channel state matrix information of some of the channels between the base station and the terminal; and send the second channel information to the base station by using the transmitter, where the first channel information and the second channel information are used to obtain channel state matrix information of the channels between the base station and the terminal.

In one embodiment, when a rank is 1, the second channel information includes: channel quality indicator CQI information, rank indicator RI information, and/or channel state matrix information of the other channels between the base station and the terminal; or channel quality indicator CQI information, rank indicator RI information, and/or partial channel state matrix information of the other channels between the base station and the terminal. When the rank is 1, the base station can obtain relatively comprehensive channel state information provided that the terminal feeds back a small amount of information.

In one embodiment, when a rank is greater than 1 and less than a maximum value of a rank of the channels between the base station and the terminal, the second channel information includes: channel state matrix information of the other channels between the base station and the terminal; or, partial channel state matrix information of the other channels between the base station and the terminal. In this design, the terminal can determine an amount of content of the second channel information based on a value of the rank. In this design, signaling resources can be properly used to enable the base station to learn of more accurate channel statuses.

In one embodiment, when a rank is equal to a maximum value of a rank of the channels between the base station and the terminal, the second channel information includes: channel state matrix information of the other channels between the base station and the terminal. In this design, the base station can obtain relatively comprehensive channel information.

In one embodiment, when a rank is greater than 1 and less than or equal to a maximum value of a rank of the channels between the base station and the terminal, the second channel information further includes channel quality indicator CQI information and/or rank indicator RI information. Feeding back the CQI information or the RI information can help the base station estimate a channel status and select a correct parameter for subsequent transmission.

In one embodiment, the channel state matrix information includes quantized channel state matrix information or non-quantized channel state matrix information. For example, the quantized channel state matrix information includes precoding matrix indicator PMI information corresponding to the channel state matrix information or quantized vector matrix information corresponding to the channel state matrix information. A quantity of bits required for expressing a channel state matrix can be effectively saved through quantization, helping properly utilize air interface resources.

In one embodiment, the channel state matrix information of the other channels between the base station and the terminal includes difference component information between a channel state matrix of the some channels between the base station and the terminal and a channel state matrix of the other channels between the base station and the terminal.

In one embodiment, the partial channel state matrix information of the other channels between the base station and the terminal includes difference component information between a channel state matrix of the some channels between the base station and the terminal and a part of a channel state matrix of the other channels between the base station and the terminal.

In one embodiment, the difference component information includes angle difference component information, amplitude difference component information, or phase difference component information. For example, the difference component information includes quantized difference component information or non-quantized difference component information. For example, the quantized difference component information includes precoding matrix indicator PMI information corresponding to the difference component information or quantized vector matrix information corresponding to the difference component information. A relatively small quantity of bits may be used to express the second channel information by using the difference component information. The quantity of bits required for expressing the second channel information can further be reduced by using the quantized difference component information.

In one embodiment, the downlink reference signal includes one or more of the following signals: a channel state information reference signal, a cell reference signal, and a demodulation reference signal.

In one embodiment, the uplink reference signal includes a sounding reference signal.

Implementation complexity of embodiments of the present invention can be reduced by using a reference signal in an existing LTE (long term evolution) system.

In the present invention, the uplink reference signal sent by the terminal is used to obtain channel state information of some channels. In addition, in combination with the channel state information fed back by the terminal based on the downlink reference signal, channel state information of more downlink channels between the base station and the terminal can be conveniently obtained. The solutions do not cause an additional delay, performance loss, or cost increase, or consume more time-frequency resources used for the uplink reference signal. Particularly, based on the solutions of the present invention, relatively complete channel state matrix information of the channels between the base station and the terminal can be obtained, helping the base station transmit data.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following descriptions show merely some embodiments of the present invention, and a person of ordinary skill in the art may derive other drawings from these accompanying drawings without creative efforts.

DESCRIPTION OF EMBODIMENTS

Figure 1:
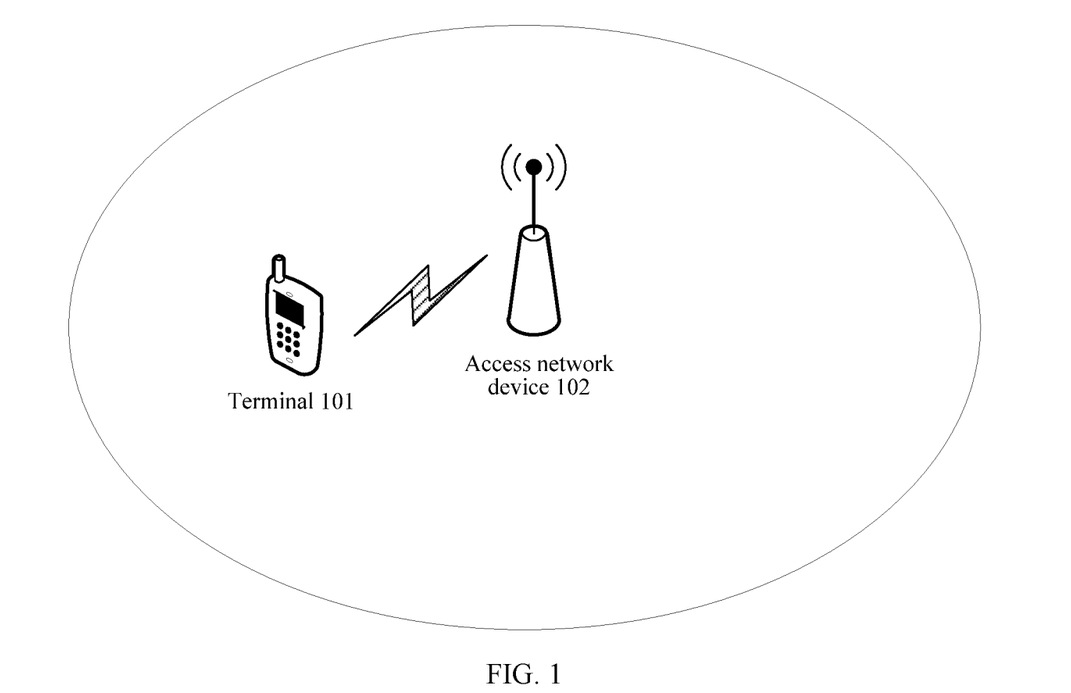
FIG. 1 is a schematic architectural diagram of a wireless network according to an embodiment of the present invention.

FIG. 1 is a schematic architectural diagram of a wireless network to which embodiments of the present invention are applicable. As shown in FIG. 1, the wireless network includes a terminal 101 and an access network device 102. To more effectively describe the solutions of the embodiments of the present invention, in FIG. 1, corresponding network elements in a core network in the wireless network are omitted. The terminal 101 can communicate with the access network device 102 using a radio access technology. The terminal 101 and the access network device 102 may use various radio access technologies, for example, use access technologies such as code division multiple access, frequency division multiple access, time division multiple access, orthogonal frequency division multiple access, and single carrier frequency division multiple access, and various subsequent access technologies used in, for example, a 4.5G (generation) network, a 5G network, and the Internet of Things (IoT). In this application, nouns "network", "wireless network", and "system" are often interchangeably used, but a person skilled in the art can understand meanings thereof.

The terminal 101 in FIG. 1 may include various handheld devices, in-vehicle devices, wearable devices, and computing devices having a wireless communication function, or other processing devices connected to a wireless modem, and various forms of user equipments (UE), mobile stations (MS), terminal equipment (TE), and the like. For ease of description, in this application, the devices mentioned above are collectively referred to as the terminal.

Figure 2:
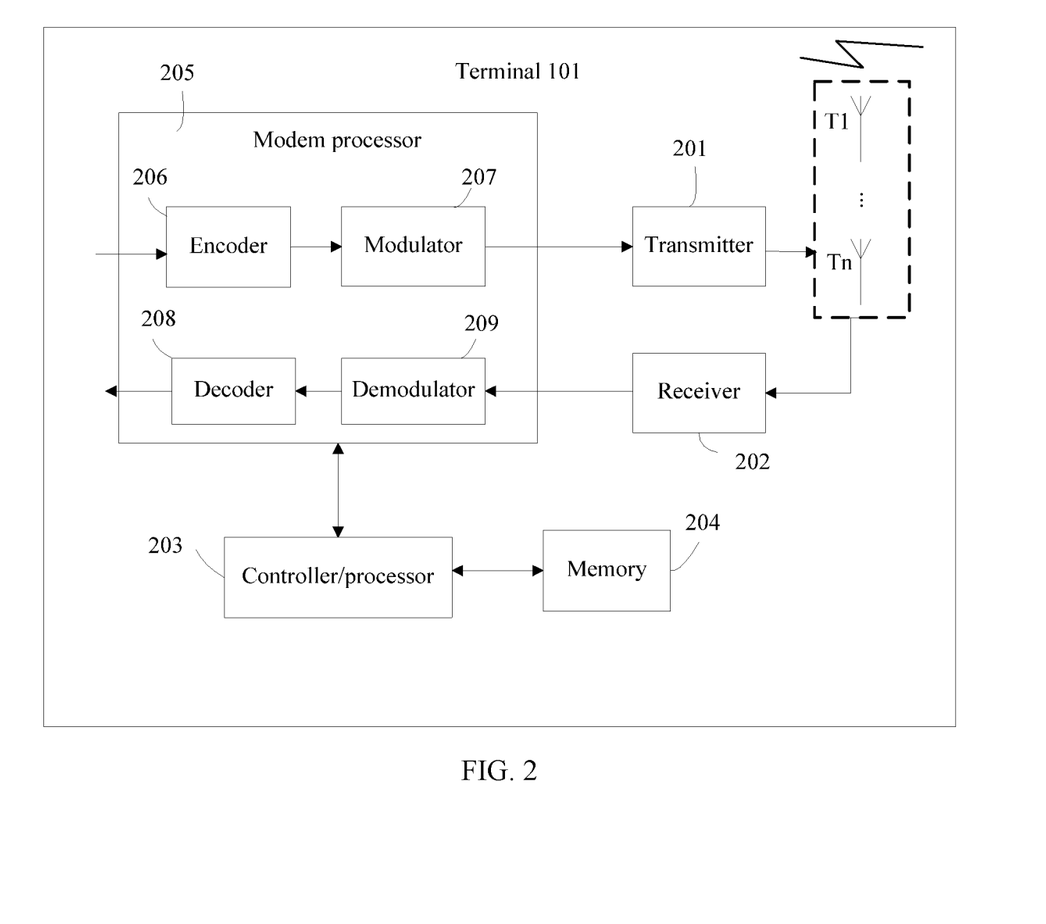
FIG. 2 is a schematic structural diagram of a terminal according to an embodiment of the present invention.

FIG. 2 is a schematic structural diagram of the terminal 101. As shown in FIG. 2, the terminal 101 may include a transmitter 201, a receiver 202, a controller/processor 203, a memory 204, a modem processor 205, and n antennas (T1, . . . , and Tn), where n is greater than or equal to 2. The transmitter 201 adjusts (for example, performs analog conversion, filtering, amplification, and up-conversion on) the output sampling and generates an uplink signal. The uplink signal is transmitted to a base station by using the antenna. On a downlink, the antenna receives a downlink signal transmitted by the base station. The receiver 202 adjusts (for example, performs filtering, amplification, down-conversion, and digitization on) a signal received by using the antenna and provides input sampling. Functions of the transmitter and the receiver may be implemented as a transceiver. In the modem processor 205, an encoder 206 receives service data and a signaling message that are to be sent on an uplink, and processes (for example, formats, encodes, and interleaves) the service data and the signaling message.

A modulator 207 further processes (for example, performs symbol mapping on and modulates) the encoded service data and signaling message and provides output sampling. A demodulator 209 processes (for example, demodulates) the input sampling and provides symbol estimation. A decoder 208 processes (for example, de-interleaves and decodes) the symbol estimation and provides the decoded data and signaling message that are to be sent to UE. The encoder 206, the modulator 207, the demodulator 209, and the decoder 208 may be implemented by the integrated modem processor 205. The controller/processor 203 can control the demodulator 205. The memory 204 can store code or data of the terminal. The controller/processor 203 may run an instruction stored in the memory 204, or may run a built-in instruction of the controller/processor 203 to implement a corresponding terminal function. These units perform processing based on a radio access technology (for example, access technologies in an LTE system and other evolved systems) used in a radio access network.

The access network device 102 in FIG. 1 is an apparatus deployed in the radio access network to provide a wireless communication function for the terminal. The access network device may include various base stations (BS), macro base stations, micro base stations, relay stations, access points, base station controllers, radio network controllers, and the like. In systems using different radio access technologies, a device having an access network device function may have different names. For example, in an LTE network, the device is referred to as an evolved NodeB (eNB or eNodeB), and in a 3G network, the device is referred to as a NodeB. For ease of description, in this application, access network devices are collectively referred to as the base station or BS.

Figure 3:
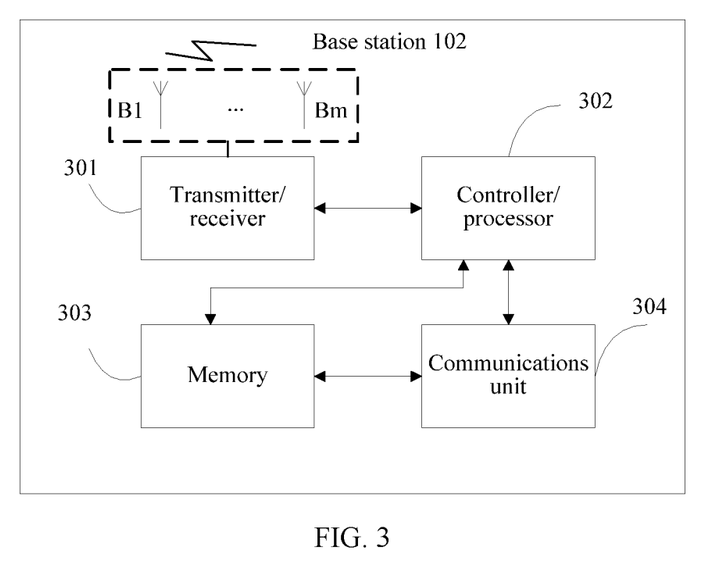
FIG. 3 is a schematic structural diagram of a base station according to an embodiment of the present invention.

FIG. 3 is a schematic structural diagram of the base station 102. As shown in FIG. 3, the base station 102 may include a transmitter/receiver 301, a controller/processor 302, a memory 303, a communications unit 304, and m antennas, where m is greater than or equal to 2. The transmitter/receiver 301 is configured to support the base station 102 in sending/receiving information to/from the terminal. Functions of the transmitter and the receiver may be implemented by using a transceiver. The controller/processor 302 performs various functions for communicating with the terminal. On an uplink, an uplink signal from the terminal is received by using an antenna, adjusted by the receiver 301, and further processed by the controller/processor 302, to restore service data and signaling information that are sent by the terminal. On a downlink, service data and a signaling message are processed by the controller/processor 302, and adjusted by the transmitter 301, to generate a downlink signal, and the downlink signal is transmitted to the terminal by using an antenna. The memory 303 is configured to store an instruction and data at the base station. The communications unit 304 is configured to support the base station to communicate with another network entity, for example, configured to support the base station to communicate with a core network device. The controller/processor 302 may run the instruction stored in the memory 304, or may run a built-in instruction of the controller/processor 302 to implement a corresponding function of the base station.

In another possible embodiment, the solutions of the present invention may further be applicable to a D2D (device to device) communication scenario. In this scenario, there may be two terminals, and the two terminals communicate with each other using a radio access technology. One of the terminals may have functions of the terminal 101 in FIG. 1 that are related to the solutions of the present invention, and the other terminal may have functions of the access network device 102 in FIG. 1 that are related to the solutions of the present invention.

In another possible embodiment, the solutions of the present invention may further be applicable to a relay communication scenario. In this scenario, one relay device and one access network device may be included, and the relay device and the access network device communicate with each other using a radio access technology. The relay device may have functions of the terminal 101 in FIG. 1 that are related to the solutions of the present invention, and the access network device may have functions of the access network device 102 in FIG. 1 that are related to the solutions of the present invention.

In another possible embodiment, the solutions of the present invention may further be applicable to another relay communication scenario. In this scenario, one terminal and one relay device may be included, and the terminal and the relay device communicate with each other using a radio access technology. The terminal may have functions of the terminal 101 in FIG. 1 that are related to the solutions of the present invention, and the relay device may have functions of the access network device 102 in FIG. 1 that are related to the solutions of the present invention.

The following embodiments are described by using examples in the network architecture shown in FIG. 1. In an optional example, in the following embodiments, the terminal 101 and the base station 102 communicate with each other using LTE technology. The terminal 101 has antennas T1, T2, T3, and T4. The terminal 101 may have only one antenna, such as the antenna T1, to send a signal to the base station 102 at a moment. The base station 102 has antennas B1, B2, B3, and B4. A person skilled in the art may know that quantities of antennas of the terminal and the base station may be different. For example, the base station may have eight antennas, and the terminal has two antennas.

Figure 4:
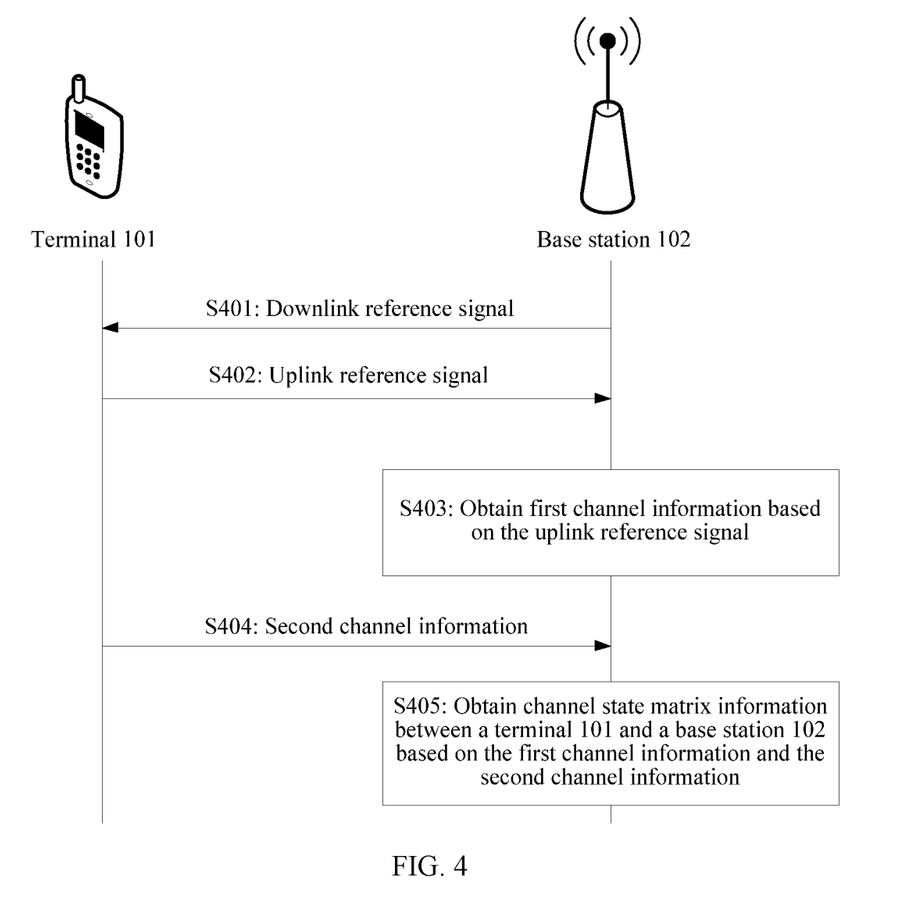
FIG. 4 is a schematic diagram of a channel information obtaining method according to an embodiment of the present invention.

To achieve inventive objectives, an embodiment of the present invention provides a channel information obtaining method. As shown in FIG. 4, the method includes the following operations.

Operation S401: A base station 102 sends a downlink reference signal.

In another embodiment, operation S401 may be described as: A terminal 101 receives a downlink reference signal from a base station 102.

Operation S402: A terminal 101 sends an uplink reference signal.

In another embodiment, operation S402 may be described as: The base station 102 receives an uplink reference signal from the terminal 101.

There is no time sequence relationship between operation S401 and operation S402.

Operation S403: The base station 102 obtains first channel information based on the uplink reference signal.

The first channel information is used to indicate channel state matrix information of some channels between the base station 102 and the terminal 101. For example, the first channel information may be used to indicate channel state matrix information $H1=[h_{T_1B_1} h_{T_1B_2} h_{T_1B_3} h_{T_1B_4}]$ of channels between T1 and B1, B2, B3, and B4 respectively. For ease of description, a channel state matrix of the some channels between the base station 102 and the terminal 101 in operation S403 is represented by H1.

Operation S404: The base station 102 receives, from the terminal 101, second channel information obtained based on the downlink reference signal.

The second channel information is used to indicate partial channel state information of channels between the base station 102 and the terminal 101. For example, the second channel information may be used to indicate channel state matrix information $$H2 = \begin{bmatrix} h_{T_2B_1} & h_{T_2B_2} & h_{T_2B_3} & h_{T_2B_4} \\ h_{T_3B_1} & h_{T_3B_2} & h_{T_3B_3} & h_{T_3B_4} \\ h_{T_4B_1} & h_{T_4B_2} & h_{T_4B_3} & h_{T_4B_4} \end{bmatrix}$$

of channels between T2, T3, and T4 and B1, B2, B3, and B4 respectively. After receiving the downlink reference signal, the terminal 101 may obtain the second channel information based on the downlink reference signal.

In another embodiment, operation S404 may be described as: The terminal 101 sends, to the base station 102, second channel information obtained based on the downlink reference signal.

Operation S405: The base station 102 obtains channel state matrix information of channels between the base station 102 and the terminal 101 based on the first channel information and the second channel information.

For example, the base station 102 may obtain channel state information $$H = \begin{bmatrix} h_{T_1B_1} & h_{T_1B_2} & h_{T_1B_3} & h_{T_1B_4} \\ h_{T_2B_1} & h_{T_2B_2} & h_{T_2B_3} & h_{T_2B_4} \\ h_{T_3B_1} & h_{T_3B_2} & h_{T_3B_3} & h_{T_3B_4} \\ h_{T_4B_1} & h_{T_4B_2} & h_{T_4B_3} & h_{T_4B_4} \end{bmatrix}$$

of the channels between the base station 102 and the terminal 101 based on H1 obtained in operation S403 and H2 obtained in operation S404. For ease of description, a channel state matrix of the channels between the base station 102 and the terminal 101 is represented by H.

Based on the foregoing operations, the base station 102 may obtain channel state matrix information of downlink channels related to a transmit antenna, for example, T1, of the terminal 101 by using the uplink reference signal sent by the terminal 101, and may obtain channel state matrix information of channels related to the other antennas, for example, T2, T3, and T4, by using feedback of the terminal 101 for the downlink reference signal, thereby obtaining relatively complete channel state matrix information of the channels between the base station 102 and the terminal 101. As can be learned, based on the method provided in the embodiment shown in FIG. 4, more channel state information of downlink channels between the base station and the terminal can be more conveniently obtained. This helps the base station 102 better transmit data to the terminal 101. In addition, this method does not cause an additional delay, performance loss, or cost increase, or consume more time-frequency resources used for the uplink reference signal.

For ease of implementing this embodiment of the present invention, some terms, concepts, and implementations in this application are further described below.

In this application, a direction in which the terminal sends a signal to the base station is referred to as an uplink, and a direction in which the base station sends a signal to the terminal is referred to as a downlink. The uplink reference signal is a reference signal sent by the terminal to the base station, and the downlink reference signal is a reference signal sent by the base station to the terminal. Since the uplink and the downlink are relative concepts, in another scenario to which the solutions of the present invention are applicable, an uplink or a downlink between different devices may be defined according to the scenario. For example, in a D2D scenario, a direction in which a terminal having functions of the terminal 101 in FIG. 1 that are related to the solutions of the present invention sends a signal to a terminal having functions of the access network device 102 in FIG. 1 that are related to the solutions of the present invention is referred to as the uplink, and an opposite direction is referred to as the downlink.

In this application, a reference signal is mainly used for channel estimation. The reference signal is usually generated based on a sequence having a particular mathematical characteristic. For example, the reference signal is generated based on a Zadoff-Chu sequence. With reference to the foregoing descriptions of the uplink and the downlink, in this application, a reference signal sent by the base station to the terminal is referred to as the downlink reference signal, and a reference signal sent by the terminal to the base station is referred to as the uplink reference signal. In one embodiment, the downlink reference signal may include a reference signal such as a CSI-RS (channel state information reference signal), a CRS (cell reference signal), or a DMRS (demodulation reference signal) sent by the base station to the terminal in an LTE technology. In one embodiment, the downlink reference signal sent by the base station may include one or more types of reference signals. For example, the base station sends a CSI-RS and a DMRS. Based on a plurality of types of reference signals, the terminal can better estimate a channel status, and obtain more comprehensive or accurate channel state information. In this way, the base station can obtain more comprehensive or accurate channel state information from the terminal. In an optional implementation, the uplink reference signal may include a reference signal such as an SRS (sounding reference signal) sent by the terminal to the base station in the LTE technology.

Figure 5:
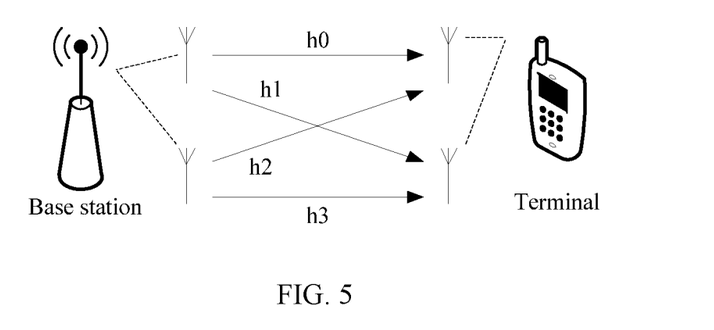
FIG. 5 is a schematic diagram of channels between a base station and a terminal according to an embodiment of the present invention.

In this application, the channel is a data signal transmission channel using a radio channel signal as a transmission medium. Usually, a quantity of channels between the terminal and the base station is related to quantities of antennas used by the terminal and the base station separately. The channel may be classified into an uplink channel and a downlink channel. A channel in a direction from the base station to the terminal may be referred to as the downlink channel, and a channel in a direction from the terminal to the base station may be referred to as the uplink channel. For example, as shown in FIG. 5, assuming that the terminal and the base station each have two antennas, there are four downlink channels (h0, h1, h2, and h3) between the terminal and the base station.

In this application, the channel state information is information reflecting a channel status. In the LTE technology, the channel state information may be simply referred to as CSI. The CSI may include PMI (precoding matrix indicator) information, RI (rank indicator) information, or CQI (channel quality indicator) information. A PMI is used to indicate a precoding matrix that the terminal recommends the base station to use in downlink transmission. One precoding matrix codebook may include a plurality of precoding matrices. A precoding matrix in the precoding matrix codebook can be indexed by using the PMI. Different transmission modes may correspond to different precoding matrix codebooks. The precoding matrix reflects information about a right unitary matrix V obtained after performing SVD (singular value decomposition, singular value decomposition) on a channel state matrix. An RI is used to indicate a transmission order that the terminal recommends the base station to use in the downlink transmission, that is, a quantity of layers used in the downlink transmission. Each layer may correspond to one effective data flow. When a value of the RI is greater than or equal to 2, the base station may simultaneously transmit a plurality of data flows. A CQI is used to indicate downlink channel quality obtained by the terminal. The base station may select an appropriate modulation and coding scheme (MCS) by using the CQI. In this application, the PMI information is information used to indicate the PMI, the RI information is information used to indicate the RI, and the CQI information is information used to indicate the CQI.

In this application, the channel state matrix is also referred to as a channel matrix or a transmission matrix, and is used to indicate a channel characteristic. In this application, the channel state matrix information is information used to indicate the channel state matrix. The channel state matrix information may have various representations. In one embodiment, the channel state matrix information may be expressed in a form of a matrix, for example, $$H = \begin{bmatrix} h_{T1B1} & h_{T1B2} & h_{T1B3} & h_{T1B4} \\ h_{T2B1} & h_{T2B2} & h_{T2B3} & h_{T2B4} \\ h_{T3B1} & h_{T3B2} & h_{T3B3} & h_{T3B4} \\ h_{T4B1} & h_{T4B2} & h_{T4B3} & h_{T4B4} \end{bmatrix}.$$

In another optional implementation, the channel state matrix information may be expressed in a form of an index. For example, both the base station and the terminal agree that an index corresponding to H is I2. The corresponding matrix H may be known only by transmitting I2 between the base station and the terminal. The channel state matrix may be a non-quantized channel state matrix or a quantized channel state matrix. Information used to indicate the quantized channel state matrix may be quantized channel state matrix information. Usually, the quantized channel state matrix information may include PMI information corresponding to the channel state matrix information or quantized vector matrix information corresponding to the channel state matrix information. Information used to indicate the non-quantized channel state matrix may be non-quantized channel state matrix information. In the channel state matrix, each row may correspond to one transmit antenna or each column may correspond to one transmit antenna. For example, in step S403, H1 may be represented as $[h_{T1B1} h_{T1B2} h_{T1B3} h_{T1B4}]$ or $$\begin{bmatrix} h_{T1B1} \\ h_{T1B2} \\ h_{T1B3} \\ h_{T1B4} \end{bmatrix}.$$

In this application, a matrix may be quantized in various manners. In one embodiment, a matrix can be quantized into a vector matrix of one or more columns. For example, the base station has eight antennas, and the terminal has four antennas. If the terminal uses an antenna 1 to send an uplink reference signal, the base station may obtain H1=[$h_{11}$, $h_{12}$, $h_{13}$, $h_{14}$, $h_{i5}$, $h_{16}$, $h_{17}$, $h_{18}$]. The terminal may obtain H1 and H2 (a channel state matrix of channels between antennas 2, 3, and 4 of the terminal and antennas of the base station) by using a downlink reference signal sent by the base station. H2=[$H_2^{(1)}$, $H_2^{(2)}$, $H_2^{(3)}$], and $H_2^{(i-1)}$=[$h_{i1}$, $h_{i2}$, $h_{i3}$, $h_{i4}$, $h_{i5}$, $h_{i6}$, $h_{i7}$ $h_{i8}$]. To save air interface resources, the terminal may feed back H2 after quantizing H2. For example, H2 is quantized into a one-column vector V2=[1, $e^{j\theta}$, $e^{j2\theta}$, $e^{j3\phi}$, $e^{j(\theta+\phi)}$, $e^{j(2\theta+\phi)}$, $e^{j(3\theta+\phi)}$]$^T$, a one-column DFT vector V2=[1, $e^{j\theta}$, $e^{j2\theta}$, $e^{j3\theta}$, $e^{j4\theta}$, $e^{j5\theta}$, $e^{j6\theta}$, $e^{j7\theta}$]$^T$, or a Kronecker product of two DFT vectors, namely V2=[1, $e^{j\theta}$, $e^{j2\theta}$, $e^{j3\theta}$]$^T \otimes$[1, $e^{j\phi}$]$^T$ or V2=[1, $e^{j\theta}$]$^T \otimes$[1, $e^{j\phi}$, $e^{j2\phi}$, $e^{j3\phi}$]$^T$, where [ ]$^T$ represents matrix transposition. For another example, H2 is quantized into a two-column DFT vector $$V_2 = \begin{bmatrix} 1 & 1 \\ e^{j\theta_1} & e^{j\theta_2} \\ M & M \\ e^{j7\theta_1} & e^{j7\theta_2} \end{bmatrix}$$

or a two-column vector $$V_2 = \begin{bmatrix} 1 & 1 \\ e^{j\theta_1} & e^{j\theta_2} \\ e^{j2\theta_1} & e^{j2\theta_2} \\ e^{j3\theta_1} & e^{j3\theta_3} \\ e^{j\varphi_1} & e^{j\varphi_2} \\ e^{j(\varphi_1+\theta_1)} & e^{j(\varphi_2+\theta_2)} \\ e^{j(\varphi_1+2\theta_1)} & e^{j(\varphi_2+2\theta_2)} \\ e^{j(\varphi_1+3\theta_1)} & e^{j(\varphi_2+3\theta_2)} \end{bmatrix},$$

where $\varphi_1$ and $\varphi_2$ may be the same or different, or a Kronecker product of two DFT vectors, namely, $$V_2 = [\, h_{T1B1} \;\; h_{T1B2} \;\; h_{T1B3} \;\; h_{T1B4} \,] \otimes \begin{bmatrix} 1 \\ e^{j\varphi} \end{bmatrix} \text{ or}$$

$$V_2 = \begin{bmatrix} 1 \\ e^{j\theta} \end{bmatrix} \otimes \begin{bmatrix} 1 & 1 \\ e^{j\varphi_1} & e^{j\varphi_2} \\ e^{j2\varphi_1} & e^{j2\varphi_2} \\ e^{j3\varphi_1} & e^{j3\varphi_2} \end{bmatrix} \text{ or}$$

$$V_2 = \begin{bmatrix} 1 \\ e^{j\theta_1} \\ e^{j2\theta_1} \\ e^{j3\theta_1} \end{bmatrix} \otimes \begin{bmatrix} 1 & 1 \\ e^{j\varphi_1} & e^{j\varphi_2} \end{bmatrix} \text{ or}$$

$$V_2 = \begin{bmatrix} 1 & 1 \\ e^{j\theta_1} & e^{j\theta_2} \end{bmatrix} \otimes \begin{bmatrix} 1 \\ e^{j\varphi_1} \\ e^{j2\varphi_1} \\ e^{j3\varphi_1} \end{bmatrix}.$$

For still another example, H2 is quantized into a three-column DFT vector $$V_2 = \begin{bmatrix} 1 & 1 & 1 \\ e^{j\theta_1} & e^{j\theta_2} & e^{j\theta_3} \\ M & M & M \\ e^{j7\theta_1} & e^{j7\theta_2} & e^{j7\theta_3} \end{bmatrix}$$

or a three-column vector $$V_2 = \begin{bmatrix} 1 & 1 & 1 \\ e^{j\theta_1} & e^{j\theta_2} & e^{j\theta_3} \\ e^{j2\theta_1} & e^{j2\theta_2} & e^{j2\theta_3} \\ e^{j3\theta_1} & e^{j3\theta_2} & e^{j3\theta_3} \\ e^{j\varphi_1} & e^{j\varphi_2} & e^{j\varphi_3} \\ e^{j(\varphi_1+\theta_1)} & e^{j(\varphi_2+\theta_2)} & e^{j(\varphi_3+\theta_3)} \\ e^{j(\varphi_1+2\theta_1)} & e^{j(\varphi_2+2\theta_2)} & e^{j(\varphi_3+2\theta_3)} \\ e^{j(\varphi_1+3\theta_1)} & e^{j(\varphi_2+3\theta_2)} & e^{j(\varphi_3+3\theta_3)} \end{bmatrix},$$

where $\varphi_1$, $\varphi_2$, and $\varphi_3$ are the same or different, or a Kronecker product of two DFT vectors, namely $$V_2 = \begin{bmatrix} 1 & 1 & 1 \\ e^{j\theta_1} & e^{j\theta_2} & e^{j\theta_3} \\ e^{j2\theta_1} & e^{j2\theta_2} & e^{j2\theta_3} \\ e^{j3\theta_1} & e^{j3\theta_2} & e^{j3\theta_3} \end{bmatrix} \otimes \begin{bmatrix} 1 \\ e^{j\varphi} \end{bmatrix} \text{ or}$$

$$V_2 = \begin{bmatrix} 1 \\ e^{j\theta} \end{bmatrix} \otimes \begin{bmatrix} 1 & 1 & 1 \\ e^{j\theta_1} & e^{j\theta_2} & e^{j\theta_3} \\ e^{j2\theta_1} & e^{j2\theta_2} & e^{j2\theta_3} \\ e^{j3\theta_1} & e^{j3\theta_2} & e^{j3\theta_3} \end{bmatrix} \text{ or}$$

$$V_2 = \begin{bmatrix} 1 \\ e^{j\theta_1} \\ e^{j2\theta_1} \\ e^{j3\theta_1} \end{bmatrix} \otimes \begin{bmatrix} 1 & 1 & 1 \\ e^{j\varphi_1} & e^{j\varphi_2} & e^{j\varphi_3} \end{bmatrix} \text{ or}$$

$$V_2 = \begin{bmatrix} 1 & 1 & 1 \\ e^{j\varphi_1} & e^{j\varphi_2} & e^{j\varphi_3} \end{bmatrix} \otimes \begin{bmatrix} 1 \\ e^{j\varphi_1} \\ e^{j2\varphi_1} \\ e^{j3\varphi_1} \end{bmatrix}.$$

To further reduce resources required for feeding back H2, a codebook may be preset. The codebook includes a vector matrix set of $V_2$. For a specific implementation, refer to the feedback manner of the PMI. In a process of selecting $V_2$ from the codebook, $V_2$ suitable for H2 may be selected according to criteria such as a maximum SINR, a maximum capacity, and a minimum pitch.

In this application, the plurality represents two or more, the plurality of types represent two or more types.

In this application, some or partial represents not all.

Operation S404 and operation S405 will be described in more detail below.

In a first optional implementation, according to one embodiment, when a rank of the channels between the base station 102 and the terminal 101 is 1, the second channel information in operation S404 may include one or more of the following information: CQI information, RI information, and channel state matrix information of the other channels between the base station 102 and the terminal 101 or partial channel state matrix information of the other channels between the base station 102 and the terminal 101. The channel state matrix information of the other channels between the base station 102 and the terminal 101 and the partial channel state matrix information of the other channels between the base station 102 and the terminal 101 have an alternative relationship. In other words, the second channel information does not include both at the same time. For ease of description, a channel state matrix of the other channels between the base station 102 and the terminal 101 is represented by H2, and a part of the channel state matrix of the other channels between the base station 102 and the terminal 101 is represented by H2'.

In a first possible design, according to one embodiment, a CQI rule is preset on the base station 102. When the CQI information received in operation S404 satisfies the foregoing CQI rule, it can be considered that in operation S404, the terminal 101 implicitly feeds back that the rank of the channels between the base station 102 and the terminal 101 is 1. When the CQI information received by the base station 102 in operation S404 satisfies the foregoing preset CQI rule, in operation S405, the base station 102 may use the channel state matrix information of the some channels obtained in operation S403 as the channel state matrix information of the channels between the base station 102 and the terminal 101. For example, the CQI rule may be that a CQI is less than a preset threshold.

In a second possible design, according to one embodiment, when the second channel information does not include the RI information, it can be considered that in operation S404, the terminal 101 implicitly feeds back that the rank of the channels between the base station 102 and the terminal 101 is 1. When the second channel information received by the base station 102 in operation S404 does not include the RI information, in operation S405, the base station 102 may use the channel state matrix information of the some channels obtained in operation S403 as the channel state matrix information of the channels between the base station 102 and the terminal 101, that is, use H1 information as H information.

In a third possible design, according to one embodiment, when the second channel information includes the RI information, in operation S404, the terminal 101 explicitly indicates that the rank of the channels between the base station 102 and the terminal 101 is 1. When the base station 102 receives rank information in operation S404, in operation S405, the base station 102 may use the channel state matrix information of the some channels obtained in operation S403 as the channel state matrix information of the channels between the base station 102 and the terminal 101, that is, use H1 information as H information.

In a fourth possible design, according to one embodiment, the base station 102 may learn, based on the channel state matrix information of the other channels between the base station 102 and the terminal 101 that is fed back by the terminal 101, that the rank of the channels between the base station 102 and the terminal 101 is 1. In other words, it can be considered that in operation S404, the terminal 101 implicitly feeds back that the rank of the channels between the base station 102 and the terminal 101 is 1. After receiving the channel state matrix information of the other channels in step S404, the base station 102 may use the channel state matrix information of the some channels obtained in operation S403 as the channel state matrix information of the channels between the base station 102 and the terminal 101, that is, use H1 information as H information. Alternatively, the base station 102 may obtain the channel state matrix information of the channels between the base station 102 and the terminal 101 after combining the channel state matrix of the some channels obtained in operation S403 with the channel state matrix of the other channels obtained in operation S404, that is, obtain H information after combining H1 with H2. For example, $H1=[h_{T_1B_1} h_{T_1B_2} h_{T_1B_3} h_{T_1B_4}]$, and $$H2 = \begin{bmatrix} h_{T_2B_1} & h_{T_2B_2} & h_{T_2B_3} & h_{T_2B_4} \\ h_{T_3B_1} & h_{T_3B_2} & h_{T_3B_3} & h_{T_3B_4} \\ h_{T_4B_1} & h_{T_4B_2} & h_{T_4B_3} & h_{T_4B_4} \end{bmatrix}.$$

$$H = \begin{bmatrix} h_{T_1B_1} & h_{T_1B_2} & h_{T_1B_3} & h_{T_1B_4} \\ h_{T_2B_1} & h_{T_2B_2} & h_{T_2B_3} & h_{T_2B_4} \\ h_{T_3B_1} & h_{T_3B_2} & h_{T_3B_3} & h_{T_3B_4} \\ h_{T_4B_1} & h_{T_4B_2} & h_{T_4B_3} & h_{T_4B_4} \end{bmatrix}$$

is obtained after combining H1 with H2.

In a fifth possible design, according to one embodiment, the base station 102 may learn, based on the partial channel state matrix information of the other channels between the base station 102 and the terminal 101 that is fed back by the terminal 101, that the rank of the channels between the base station 102 and the terminal 101 is 1. In other words, it can be considered that in step S404, the terminal 101 implicitly feeds back that the rank of the channels between the base station 102 and the terminal 101 is 1. After receiving the partial channel state matrix information of the other channels in step S404, the base station 102 may use the channel state matrix information of the some channels obtained in operation S403 as the channel state matrix information of the channels between the base station 102 and the terminal 101, that is, use H1 information as H information. Alternatively, the base station 102 may obtain the channel state matrix information of the channels between the base station 102 and the terminal 101 after combining the channel state matrix of the some channels obtained in operation S403 with the part of the channel state matrix of the other channels obtained in operation S404, that is, obtain H information after combining H1 with H2'. For example, $$H2' = \begin{bmatrix} h_{T_2B_1} & h_{T_2B_2} & h_{T_2B_3} & h_{T_2B_4} \\ h_{T_3B_1} & h_{T_3B_2} & h_{T_3B_3} & h_{T_3B_4} \end{bmatrix},$$

and H1=[$h_{T_1B1} h_{T_1B2} h_{T_1B3} h_{T_1B4}$].

$$H = \begin{bmatrix} h_{T1B1} & h_{T1B2} & h_{T1B3} & h_{T1B4} \\ h_{T2B1} & h_{T2B2} & h_{T2B3} & h_{T2B4} \\ h_{T3B1} & h_{T3B2} & h_{T3B3} & h_{T3B4} \end{bmatrix}$$

is obtained after combining H2' with H1.

In this application, combining processing of two matrices may include various processing for obtaining one matrix by using the two matrices.

In one embodiment, in this application, the second channel information may further include all or partial channel state matrix information of the some channels in operation S403, that is, information about some rows or columns in H1. Because the second channel information is obtained through measurement by the terminal 101 based on the downlink reference signal, the base station 102 may use the second channel information to optimize the channel state matrix information of the some channels obtained based on the uplink reference signal in operation S403, so as to obtain more accurate channel state matrix information of the some channels. For example, averaging processing may be performed on repeated rows or columns in H1 and H2.

In one embodiment, in this application, the base station 102 may optimize the channel state matrix of the some channels obtained in operation S403, that is, perform optimization processing on H1, based on another parameter fed back by the terminal 101. The base station 102 may use optimized H1 to obtain the H information. For example, optimized partial channel state matrix information of the some channels is used as the channel state matrix information of the channels between the base station 102 and the terminal 101. That is, the optimized H1 information is used as the H information. For another example, an optimized channel state matrix of the some channels is combined with the channel state matrix of the other channels to obtain the channel state matrix information of the channels between the base station 102 and the terminal 101. That is, optimized H1 is combined with H2 to obtain the H information. For still another example, an optimized channel state matrix of some channels is combined with the part of the channel state matrix of the other channels to obtain the channel state matrix information of the channels between the base station 102 and the terminal 101. That is, optimized H1 is combined with H2' to obtain the H information.

In one embodiment, the channel state matrix of the other channels or the part of the channel state matrix of the other channels in operation S404 may be a channel state matrix obtained after averaging or weighting processing. That is, H2 or H2' may be a matrix obtained after averaging or weighting processing.

In this application, the averaging processing on the matrix may be row averaging processing or column averaging processing on the matrix. For examlple $$H2' = \begin{bmatrix} h_{T2B1} & h_{T2B2} & h_{T2B3} & h_{T2B4} \\ h_{T3B1} & h_{T3B2} & h_{T3B3} & h_{T3B4} \end{bmatrix}.$$

When only one row needs to be fed back, row averaging processing may be performed on H2', to obtain $$H2' = \begin{bmatrix} \frac{h_{T2B1}+h_{T3B1}}{2} & \frac{h_{T2B2}+h_{T3B2}}{2} & \frac{h_{T2B3}h_{T2B4}+h_{T3B3}h_{T3B4}}{2} \end{bmatrix}.$$

The weighting processing on the matrix may include multiplying the matrix by a weight coefficient. For example, $$H2' = \begin{bmatrix} h_{T2B1} & h_{T2B2} & h_{T2B3} & h_{T2B4} \\ h_{T3B1} & h_{T3B2} & h_{T3B3} & h_{T3B4} \end{bmatrix},$$

and weighting processing $$\begin{bmatrix} h_{T2B1} & h_{T2B2} & h_{T2B3} & h_{T2B4} \\ h_{T3B1} & h_{T3B2} & h_{T3B3} & h_{T3B4} \end{bmatrix} * \begin{bmatrix} W_1 \\ W_2 \end{bmatrix}$$

is performed on H2', where $W_1$ and $W_2$ represent weight coefficients.

Optionally, in this application, after obtaining H2 or H2', the base station 102 may perform averaging processing or weighting processing on H2 or H2', and obtain H based on H2 or H2' obtained after the averaging processing or the weighting processing.

In one embodiment, quantization processing, averaging processing, weighting processing, or optimization processing on a channel state matrix (for example, H1, H2, or H2') may be combined according to an actual situation. For example, according to an actual requirement, quantization processing may be first performed on a channel state matrix and averaging or weighting processing is then performed on the channel state matrix obtained after the quantization processing, or averaging or weighting processing may be first performed and quantization processing is then performed on a channel state matrix.

In one embodiment, the channel state matrix information of the other channels between the base station 102 and the terminal 101 may include difference component information of the channel state matrix of the some channels between the base station 102 and the terminal 101 in operation S403 and the channel state matrix of the other channels between the base station 102 and the terminal 101, that is, difference component information between H1 and H2.

In one embodiment, the partial channel state matrix information of the other channels between the base station 102 and the terminal 101 may include difference component information of the channel state matrix of the some channels between the base station 102 and the terminal 101 in operation S403 and the part of the channel state matrix of the other channels between the base station 102 and the terminal 101, that is, difference component information between H1 and H2'.

In one embodiment, the difference component information is information used to indicate a difference component. For example, a difference component of two matrices may include an angle difference component, an amplitude difference component, or a phase difference component. For example, the base station has eight antennas, and the terminal has four antennas. If the terminal uses an antenna 1 to send an uplink reference signal, the base station may obtain H1=[$h_{12}$, $h_{13}$, $h_{14}$, $h_{15}$, $h_{16}$, $h_{17}$, $h_{18}$]. The terminal may obtain H1 and H2 (a channel state matrix of channels between antennas 2, 3, and 4 of the terminal and antennas of the base station) by using a downlink reference signal sent by the base station. H2=[$H_2^{(1)}$, $H_2^{(2)}$, $H_2^{(3)}$], and $H_2^{(i-1)}$=[$h_{i1}$, $h_{i2}$, $h_{i3}$, $h_{i4}$, $h_{i5}$, $h_{i6}$, $h_{i7}$, $h_{i8}$]. A difference component corresponding to H2 may be D(H2)=[$H2^{(1)}$−H1, $H2^{(2)}$−H1, $H2^{(3)}$−H1]. A phase difference component may be obtained through vector matrix operation. For example, $$H2 = \begin{bmatrix} 1 \\ e^{j\theta_2} \end{bmatrix}, H_2 = \begin{bmatrix} 1 \\ e^{j\theta_1} \end{bmatrix},$$

and the phase difference component $$D(H2) = \begin{bmatrix} 1*(1)^H \\ e^{j\theta_2}*(e^{j\theta_1})^H \end{bmatrix}.$$

An angle difference component may be an angle difference between vector matrices. For example $$H2 = \begin{bmatrix} 1 \\ e^{j\theta_2} \end{bmatrix}, H1 = \begin{bmatrix} 1 \\ e^{j\theta_1} \end{bmatrix},$$

and an angle difference component between H2 and H1 is $D(H2)=\theta_2-\theta_1$. For another example, $$H2 = \begin{bmatrix} 1 \\ e^{j\theta_2} \\ M \\ e^{jM\theta_2} \end{bmatrix}, H1 = \begin{bmatrix} 1 \\ e^{j\theta_1} \\ M \\ e^{jM\theta_1} \end{bmatrix},$$

and an angle difference component between H2 and H1 is $D(H2)=\theta_2-\theta_1$. For another example, $$H2 = \begin{bmatrix} 1 & 1 & L & 1 \\ e^{j\theta_2^{(1)}} & e^{j\theta_2^{(2)}} & L & e^{j\theta_2^{(K)}} \\ M & M & O & M \\ e^{jM\theta_2^{(1)}} & e^{jM\theta_2^{(2)}} & L & e^{jM\theta_2^{(K)}} \end{bmatrix}, H1 = \begin{bmatrix} 1 \\ e^{j\theta_1} \\ M \\ e^{jM\theta_1} \end{bmatrix},$$

and an angle difference component between H2 and H1 is $D(H2)=[\theta_2^{(1)}\theta_2^{(2)}\Lambda\theta_2^{(K)}]-\theta_1$. The terminal may alternatively feed back the foregoing difference component information to the base station by using the PMI. In this application, quantization processing, averaging processing, weighting processing, or optimization processing may be performed the foregoing difference components.

In a second optional implementation, according to one embodiment, when a rank of the channels between the base station 102 and the terminal 101 is greater than 1 and less than a maximum value of the rank of the channels between the base station 102 and the terminal 101, the second channel information in step S404 may include one of the following information:

channel state matrix information of the other channels between the base station 102 and the terminal 101, namely, H2 information; and partial channel state matrix information of the other channels between the base station 102 and the terminal 101, namely, H2' information.

In this application, the maximum value of the rank of the channels between the base station 102 and the terminal 101 is a maximum value that the rank of the channels between the base station 102 and the terminal 101 can theoretically reach. For example, the maximum value of the rank of the channels between the base station and the terminal is 4 in FIG. 5.

In a first possible design, according to one embodiment, the second channel information includes the H2 information. In operation S405, the base station 102 may combine H1 with H2 to obtain H information. Optionally, the base station 102 may obtain a value of the rank of the channels between the base station 102 and the terminal 101 based on the channel state matrix information of the other channels between the base station 102 and the terminal 101 that is obtained in operation S404. Optionally, optimization processing, quantization processing, weighting processing, or averaging processing may be performed on H1 or H2 according to an actual requirement. For a specific implementation, refer to the first optional implementation. The H information may be obtained based on the foregoing processed H1 or H2.

In a second possible design, according to one embodiment, the second channel information includes the H2' information. In operation S405, the base station 102 may combine H1 with H2' to obtain H information. Optionally, the base station 102 may obtain a value of the rank of the channels between the base station 102 and the terminal 101 based on the H2' information. In one embodiment, optimization processing, quantization processing, weighting processing, or averaging processing may be performed on H1 or H2' according to an actual requirement. For a specific implementation, refer to the first optional implementation. The H information may be obtained based on the foregoing processed H1 or H2'.

In a third optional implementation, according to one embodiment, when a rank of the channels between the base station 102 and the terminal 101 is equal to a maximum value of the rank of the channels between the base station 102 and the terminal 101, the second channel information in step S404 may include channel state matrix information of the other channels between the base station 102 and the terminal 101, namely, H2 information.

In a possible embodiment, in operation S405, the base station 102 may combine H1 with H2 to obtain the H information. Optionally, the base station 102 may obtain a value of the rank of the channels between the base station 102 and the terminal 101 based on the channel state matrix information of the other channels between the base station 102 and the terminal 101 that is obtained in operation S404. Optionally, optimization processing, quantization processing, weighting processing, or averaging processing may be performed on H1 or H2 according to an actual requirement. For a specific implementation, refer to the first optional implementation. The H information may be obtained based on the foregoing processed H1 or H2.

In one embodiment, in the foregoing second and third optional implementations, the second channel information may further include CQI information and/or RI information.

In one embodiment, in the foregoing first to third optional implementations, the base station 102 may receive, from the terminal 101, a sequence number of a transmit antenna corresponding to uplink reference information. The sequence number of the transmit antenna may be used to adjust a sequence of rows or columns of H.

In one embodiment, in the foregoing first to third optional implementations, the base station 102 may send indication information to the terminal 101, to instruct to perform hybrid feedback of channel information, that is, instruct the terminal 101 to perform the method shown in FIG. 4.

To implement the foregoing method provided in this embodiment of the present invention, functions related to the solutions of the present invention can be implemented by modifying or redesigning an existing terminal or base station.

In one embodiment, the receiver 202 of the terminal shown in FIG. 2 may be configured to implement a related function of receiving the downlink reference signal in operation S401, and the transmitter 201 may be configured to implement a related function of sending the uplink reference signal in operation S402 and a related function of sending the second channel information in operation S404. The controller/processor 203 may be configured to control the transmitter 201 and the receiver 202, to implement the foregoing functions related to the terminal in step S401, operation S402, and operation S404. In an optional design, the memory 204 may store program code used to implement a function related to the terminal in the embodiment shown in FIG. 4, and the controller/processor 203 runs the program code to control a corresponding component to implement the related function.

In one embodiment, the transmitter/receiver 301 of the base station shown in FIG. 3 may be configured to implement a related function of sending the downlink reference signal in operation S401, a related function of receiving the uplink reference signal in operation S402, and a related function of receiving the second channel information in operation S404. The controller/processor 302 may be configured to implement a related function of obtaining the first channel information in operation S403 and a related function of obtaining the channel state matrix information of the channels between the terminal 101 and the base station 102 in operation S405. Optionally, the controller/processor 302 may be configured to control the transmitter/receiver 301, to implement the foregoing functions related to the base station in operation S401, operation S402, and operation S404. In an optional design, the memory 303 may store program code used to implement a function related to the base station in the embodiment shown in FIG. 4, and the controller/processor 302 runs the program code to control a corresponding component to implement the related function.

It may be understood that FIG. 2 shows merely a simplified design of the terminal. In an actual application, the terminal may include any quantity of transmitters, receivers, processors, controllers, memories, modems, and the like, and all base stations that can implement the present invention shall fall within the protection scope of the present invention.

It may be understood that FIG. 3 shows merely a simplified design of the base station. In an actual application, the base station may include any quantity of transmitters, receivers, processors, controllers, memories, communications units, and the like, and all base stations that can implement the present invention shall fall within the protection scope of the present invention.

With development of technologies, various functions or operating mechanisms in the LTE technology related to this application may change, and various changed functions or operating mechanisms in the LTE technology related to this application are still applicable to the technical solutions of the present invention without conflicting with the inventive objectives of embodiments of the present invention.

The controller/processor for performing a function of the foregoing terminal or base station in the present invention may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various examples of logical blocks, modules, and circuits described with reference to content disclosed in the present invention. The processor may also be a combination that implements a computing function, for example, a combination of one or more microprocessors or a combination of a DSP and a microprocessor.

The method or algorithm steps described with reference to the content disclosed in the present invention may be implemented by hardware, or may be implemented by a processor executing a software instruction. The software instruction may include a corresponding software module. The software module may be stored in a RAM memory, a flash memory, a ROM memory, an EPROM memory, an EEPROM memory, a register, a hard disk, a removable hard disk, a CD-ROM, or a storage medium in any other forms well-known in the art. A storage medium used as an example is coupled to the processor, so that the processor can read information from the storage medium, and can write information into the storage medium. Certainly, the storage medium may be a part of the processor. The processor and the storage medium may be located in an ASIC. In addition, the ASIC may be located in user equipment. Certainly, the processor and the storage medium may exist in the user equipment as discrete components.

A person skilled in the art should be aware that in one or more of the foregoing examples, the functions described in the present invention may be implemented by using hardware, software, firmware, or any combination thereof. When the functions are implemented by software, the functions may be stored in a computer-readable medium or transmitted as one or more instructions or code in a computer-readable medium. The computer-readable medium includes a computer storage medium and a communications medium, where the communications medium includes any medium that enables a computer program to be transmitted from one place to another. The storage medium may be any available medium accessible by a general-purpose or special purpose computer.

A person of ordinary skill in the art may understand that an accompanying drawing is merely a schematic diagram of an embodiment, and modules or processes in the accompanying drawing are not necessarily required for implementing the present invention.

The objectives, technical solutions, and beneficial effects of the present invention are further described in detail in the foregoing specific embodiments. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:

1. A channel information obtaining method, comprising:
sending, by a base station, a downlink reference signal to a terminal, wherein the downlink reference signal is used to obtain second channel information using feedback of the terminal to the downlink reference signal, and the second channel information is used to indicate channel state matrix information of a second subset of channels between the base station and the terminal;
receiving, by the base station, an uplink reference signal from the terminal, wherein the uplink reference signal is used to obtain first channel information using the uplink reference signal, and the first channel information is used to indicate channel state matrix information of a first subset of the channels between the base station and the terminal; and receiving, by the base station, the second channel information from the terminal, wherein the first channel information and the second channel information are combined by the base station to obtain channel state matrix information of the channels between the base station and the terminal.

2. The method according to claim 1, further comprising:
receiving, by the base station from the terminal, a sequence number of a transmit antenna corresponding to the uplink reference signal, wherein the sequence number of the transmit antenna is used to adjust a sequence of rows or columns of a channel state matrix of the channels between the base station and the terminal.

3. The method according to claim 2, further comprising:
sending, by the base station, indication information to the terminal, wherein the indication information is used to instruct to perform a hybrid feedback of channel information.

4. A channel information obtaining method, comprising:
receiving, by a terminal, a downlink reference signal from a base station, wherein the downlink reference signal is used to obtain second channel information using feedback of the terminal to the downlink reference signal, and the second channel information is used to indicate channel state matrix information of a second subset of channels between the base station and the terminal;

sending, by the terminal, an uplink reference signal to the base station, wherein the uplink reference signal is used to obtain first channel information using the uplink reference signal, and the first channel information is used to indicate channel state matrix information of a first subset of the channels between the base station and the terminal; and sending, by the terminal, the second channel information to the base station, wherein the first channel information and the second channel information are combined by the base station to obtain channel state matrix information of the channels between the base station and the terminal.

5. The method according to claim 4, further comprising:
sending, by the terminal to the base station, a sequence number of a transmit antenna corresponding to the uplink reference signal, wherein the sequence number of the transmit antenna is used to adjust a sequence of rows or columns of a channel state matrix of the channels between the base station and the terminal.

6. The method according to claim 5, further comprising:
receiving, by the terminal, indication information from the base station, wherein the indication information is used to instruct to perform a hybrid feedback of channel information.

7. The method according to claim 6, wherein when a rank is 1, the second channel information comprises:
channel quality indicator (CQI) information, rank indicator (RI) information, and/or channel state matrix information of other channels between the base station and the terminal; or channel quality indicator (CQI) information, rank indicator (RI) information, and/or partial channel state matrix information of other channels between the base station and the terminal.

8. The method according to claim 6, wherein when a rank is greater than 1 and less than a maximum value of a rank of the channels between the base station and the terminal, the second channel information comprises:
channel state matrix information of other channels between the base station and the terminal; or
partial channel state matrix information of other channels between the base station and the terminal.

9. The method according to claim 6, wherein when a rank is equal to a maximum value of a rank of the channels between the base station and the terminal, the second channel information comprises:
channel state matrix information of other channels between the base station and the terminal.

10. The method according to claim 9, wherein the second channel information further comprises:
channel quality indicator (CQI) information and/or rank indicator (RI) information.

11. A base station, comprising:
a processor,
a transmitter, and
a receiver, wherein the processor is configured to:
send a downlink reference signal to a terminal using the transmitter, wherein the downlink reference signal is used to obtain second channel information using feedback of the terminal to the downlink reference signal, and the second channel information is used to indicate channel state matrix information of a second subset of channels between the base station and the terminal;

receive an uplink reference signal from the terminal using the receiver, wherein the uplink reference signal is used to obtain first channel information using the uplink reference signal, and the first channel information is used to indicate channel state matrix information of a first subset of the channels between the base station and the terminal; and receive the second channel information from the terminal using the receiver, wherein the first channel information and the second channel information are combined by the base station to obtain channel state matrix information of the channels between the base station and the terminal.

12. The base station according to claim 11, wherein the processor is further configured to:
receive, from the terminal using the receiver, a sequence number of a transmit antenna corresponding to the uplink reference signal, wherein the sequence number of the transmit antenna is used to adjust a sequence of rows or columns of a channel state matrix of the channels between the base station and the terminal.

13. The base station according to claim 12, wherein the processor is further configured to:
send indication information to the terminal using the transmitter, wherein the indication information is used to instruct to perform a hybrid feedback of channel information.

14. A terminal, comprising:
a processor,
a receiver, and
a transmitter, wherein the processor is configured to:
receive a downlink reference signal from a base station using the receiver, wherein the downlink reference signal is used to obtain second channel information using feedback of the terminal to the downlink reference signal, and the second channel information is used to indicate channel state information of a second subset of channels between the base station and the terminal;

send an uplink reference signal to the base station using the transmitter, wherein the uplink reference signal is used to obtain first channel information using the uplink reference signal, and the first channel information is used to indicate channel state matrix information of a first subset of the channels between the base station and the terminal; and send the second channel information to the base station using the transmitter, wherein the first channel information and the second channel information are combined by the base station to obtain channel state matrix information of the channels between the base station and the terminal.

15. The terminal according to claim 14, wherein the processor is further configured to:

send, to the base station, a sequence number of a transmit antenna corresponding to the uplink reference signal using the transmitter, wherein the sequence number of the transmit antenna is used to adjust a sequence of rows or columns of a channel state matrix of the channels between the base station and the terminal.

16. The terminal according to claim 15, wherein the processor is further configured to:

receive indication information from the base station using the receiver, wherein the indication information is used to instruct to perform a hybrid feedback of channel information.

17. The terminal according to claim 16, wherein when a rank is 1, the second channel information comprises:

channel quality indicator (CQI) information, rank indicator (RI) information, and/or channel state matrix information of other channels between the base station and the terminal; or channel quality indicator (CQI) information, rank indicator (RI) information, and/or partial channel state matrix information of other channels between the base station and the terminal.

18. The terminal according to claim 16, wherein when a rank is greater than 1 and less than a maximum value of a rank of the channels between the base station and the terminal, the second channel information comprises:

channel state matrix information of other channels between the base station and the terminal; or partial channel state matrix information of other channels between the base station and the terminal.

19. The terminal according to claim 16, wherein when a rank is equal to a maximum value of a rank of the channels between the base station and the terminal, the second channel information comprises:

channel state matrix information of other channels between the base station and the terminal.

20. The terminal according to claim 19, wherein the second channel information further comprises:

channel quality indicator (CQI) information and/or rank indicator (RI) information.

* * * * *